United States Patent
Park et al.

(10) Patent No.: US 12,429,143 B2
(45) Date of Patent: Sep. 30, 2025

(54) WASHER LIQUID SUPPLY VALVE

(71) Applicants: Hyundai Motor Company, Seoul (KR); Kia Corporation, Seoul (KR); UNICK CORPORATION, Gimhae-si (KR); DY AUTO Corporation, Anyang-si (KR)

(72) Inventors: Jong Min Park, Seoul (KR); Nak Kyoung Kong, Seongnam-si (KR); Jin Hee Lee, Seoul (KR); Ki Hong Lee, Seoul (KR); Chang Hoon Lee, Gimhae-si (KR); Ho Hoon Hwang, Busanjin-gu (KR); Eui Dong Roh, Busan (KR); Ki Ryong Lee, Yongin-si (KR); Jong Wook Lee, Yongin-si (KR); Sin Won Kang, Anyang-si (KR); Seong Jun Kim, Anyang-si (KR); Jong-hyun Jin, Anyang-si (KR); Moo Ha Hwang, Seongnam-si (KR); Yeong-Su Kim, Seongnam-si (KR); Gyu Won Han, Incheon (KR); Young Joon Shin, Seongnam-si (KR)

(73) Assignees: Hyundai Motor Company, Seoul (KR); Kia Corporation, Seoul (KR); UNICK CORPORATION, Gimhae-si (KR); DY AUTO Corporation, Asan-si (KR)

( * ) Notice: Subject to any disclaimer, the term of this patent is extended or adjusted under 35 U.S.C. 154(b) by 659 days.

(21) Appl. No.: 17/453,711

(22) Filed: Nov. 5, 2021

(65) Prior Publication Data
US 2022/0144216 A1    May 12, 2022

(30) Foreign Application Priority Data
Nov. 6, 2020    (KR) .......................... 10-2020-0147664

(51) Int. Cl.
*F16K 27/02* (2006.01)
*F16K 31/06* (2006.01)

(52) U.S. Cl.
CPC ........ *F16K 27/029* (2013.01); *F16K 31/0658* (2013.01)

(58) Field of Classification Search
CPC .......... B60S 1/52; B60S 1/583; F16K 27/029; F16K 31/0622; F16K 31/0624;
(Continued)

(56) References Cited

U.S. PATENT DOCUMENTS 2,835,468 A  *  5/1958  Sparks ................ F16K 31/0668
                                            251/129.15
3,929,315 A  *  12/1975  Rieth .................. F16K 31/0658
                                            251/129.01
(Continued)

FOREIGN PATENT DOCUMENTS

JP              3188208 U      1/2014
KR            101930466 B1    12/2018

*Primary Examiner* — Kenneth Rinehart
*Assistant Examiner* — Jonathan J. Waddy
(74) *Attorney, Agent, or Firm* — Slater Matsil, LLP

(57) ABSTRACT

A washer liquid supply valve includes a valve body provided with an inflow hole and a discharge hole configured to allow a washer liquid to flow into and out of the valve body therethrough, a housing detachably combined with an upper part of the valve body, a coil assembly installed in the housing and configured to generate magnetic force when power is applied to the washer liquid supply valve, a core combined with the coil assembly while penetrating the coil assembly and magnetized by the magnetic force generated by the coil assembly, plunger installed in the core so as to be movable and configured to be moved upwards when power is applied to the washer liquid supply valve, and a spring
(Continued)

interposed between the core and the plunger so as to elastically support the plunger towards the valve body.

15 Claims, 6 Drawing Sheets

(58) Field of Classification Search
CPC ............ F16K 31/0651; F16K 31/0655; F16K 31/0658; F16K 31/0662
See application file for complete search history.

(56) References Cited

U.S. PATENT DOCUMENTS

| | | | | |
|---|---|---|---|---|
| 6,269,834 | B1* | 8/2001 | Huhnen | F15B 13/0817 |
| | | | | 137/884 |
| 8,684,036 | B1* | 4/2014 | Satoda | F16K 27/029 |
| | | | | 137/625.33 |
| 2007/0241298 | A1* | 10/2007 | Herbert | F16K 37/0041 |
| | | | | 251/129.04 |
| 2011/0272611 | A1* | 11/2011 | Huang | F16K 27/0236 |
| | | | | 251/129.15 |
| 2012/0168655 | A1* | 7/2012 | Chuang | F16K 1/38 |
| | | | | 251/129.15 |
| 2014/0166916 | A1* | 6/2014 | Buse | F02B 37/186 |
| | | | | 251/186 |
| 2015/0027571 | A1* | 1/2015 | Kishi | F16K 27/029 |
| | | | | 137/614.2 |
| 2015/0330271 | A1* | 11/2015 | Lappan | F16K 27/041 |
| | | | | 137/625.48 |
| 2015/0330514 | A1* | 11/2015 | Harada | B60K 15/03519 |
| | | | | 137/484.2 |
| 2016/0329143 | A1* | 11/2016 | Irie | F16K 27/048 |
| 2017/0067567 | A1* | 3/2017 | No | F16K 7/12 |
| 2018/0283572 | A1* | 10/2018 | Bartow | B29C 66/24221 |
| 2020/0149654 | A1* | 5/2020 | Cao | F16K 41/043 |
| 2021/0261097 | A1* | 8/2021 | Grether | B05B 1/3006 |

* cited by examiner

WASHER LIQUID SUPPLY VALVE

CROSS-REFERENCE TO RELATED APPLICATIONS

This application claims the benefit of Korean Patent Application No. 10-2020-0147664, filed on Nov. 6, 2020, which application is hereby incorporated herein by reference.

TECHNICAL FIELD

The present disclosure relates to a washer liquid supply valve. More particularly, it relates to a washer liquid supply valve which may smoothly supply a washer liquid to be sprayed onto the window of a vehicle.

BACKGROUND

In general, a wiper is a kind of safety device assisting a driver to secure a clear view by removing foreign substances, such as rainwater, from the window of a vehicle. Wipers are installed on a front window and/or a rear window depending on the type of a vehicle, and for example, wipers are installed on a front window of a sedan, and wipers are installed on a rear window of a coupe or a hatchback.

In order to more effectively remove foreign substances, such as rainwater, from a window, a washer liquid is used. The washer liquid serves to easily remove foreign substances and to reduce friction between the window and a wiper blade so as to prevent occurrence of scratches on the window.

A washer liquid injection device includes a storage tank configured to store a washer liquid, a pump configured to pump the washer liquid stored in the storage tank, a hose configured such that the pumped washer liquid is delivered therethrough, and a nozzle configured to spray the washer liquid, delivered through the hose, onto a window.

The washer liquid in the storage tank is supplied to the nozzle through the hose when the pump is operated, and then, the washer liquid returns to the storage tank through the hose when operation of the pump is stopped.

When the washer liquid returns to the storage tank, the hose is filled with air, and thus, although the pump is re-operated, the washer liquid cannot be smoothly supplied to the nozzle due to air filling the hose.

In order to solve the above problem, a check valve may be installed in the washer liquid injection device. The check valve serves to prevent the washer liquid from returning to the storage tank when operation of the pump is stopped.

However, the conventional check valve is configured to prevent back flow of the washer liquid using elasticity of a spring, and has drawbacks in that a reaction time taken to spray the washer liquid through the nozzle after operation of the pump is very long and noise is caused by the spring.

The above information disclosed in this Background section is only for enhancement of understanding of the background of the invention and therefore it may contain information that does not form the prior art that is already known in this country to a person of ordinary skill in the art.

SUMMARY

The present disclosure relates to a washer liquid supply valve. Particular embodiments relate to a washer liquid supply valve which may smoothly supply a washer liquid to be sprayed onto the window of a vehicle.

Embodiments of the present invention can solve above-described problems associated with the prior art and can provide a washer liquid supply valve which may have an improved structure so as to enhance operability, responsiveness and effectiveness.

Embodiments of the present invention can provide a washer liquid supply valve that may be easily assembled through one-touch combination between a valve body and a housing, may shorten a time taken to assemble the washer liquid supply valve, and may improve productivity.

In one aspect, the present invention provides a washer liquid supply valve including a valve body provided with an inflow hole and a discharge hole configured to allow a washer liquid to flow into and out of the valve body therethrough, and a flow path configured to connect the inflow hole and the discharge hole, a housing detachably combined with an upper part of the valve body, a coil assembly installed in the housing and configured to generate magnetic force when power is applied to the washer liquid supply valve, a core combined with the coil assembly while penetrating the coil assembly and magnetized by the magnetic force generated by the coil assembly, a plunger installed in the core so as to be movable and configured to be moved upwards when power is applied to the washer liquid supply valve, a spring interposed between the core and the plunger so as to elastically support the plunger towards the valve body, and a valve member installed at a lower end of the plunger and configured to open or close the flow path when the plunger is moved.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
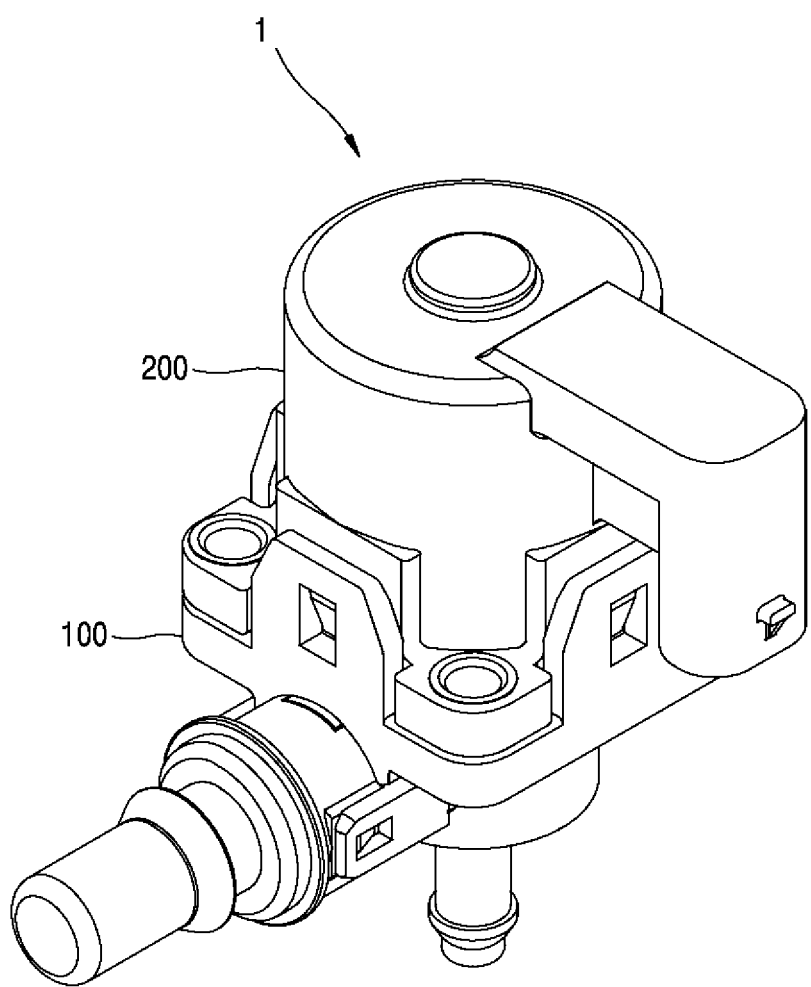
FIG. 1 is a perspective view of a washer liquid supply valve according to one embodiment of the present invention.
Figure 2:
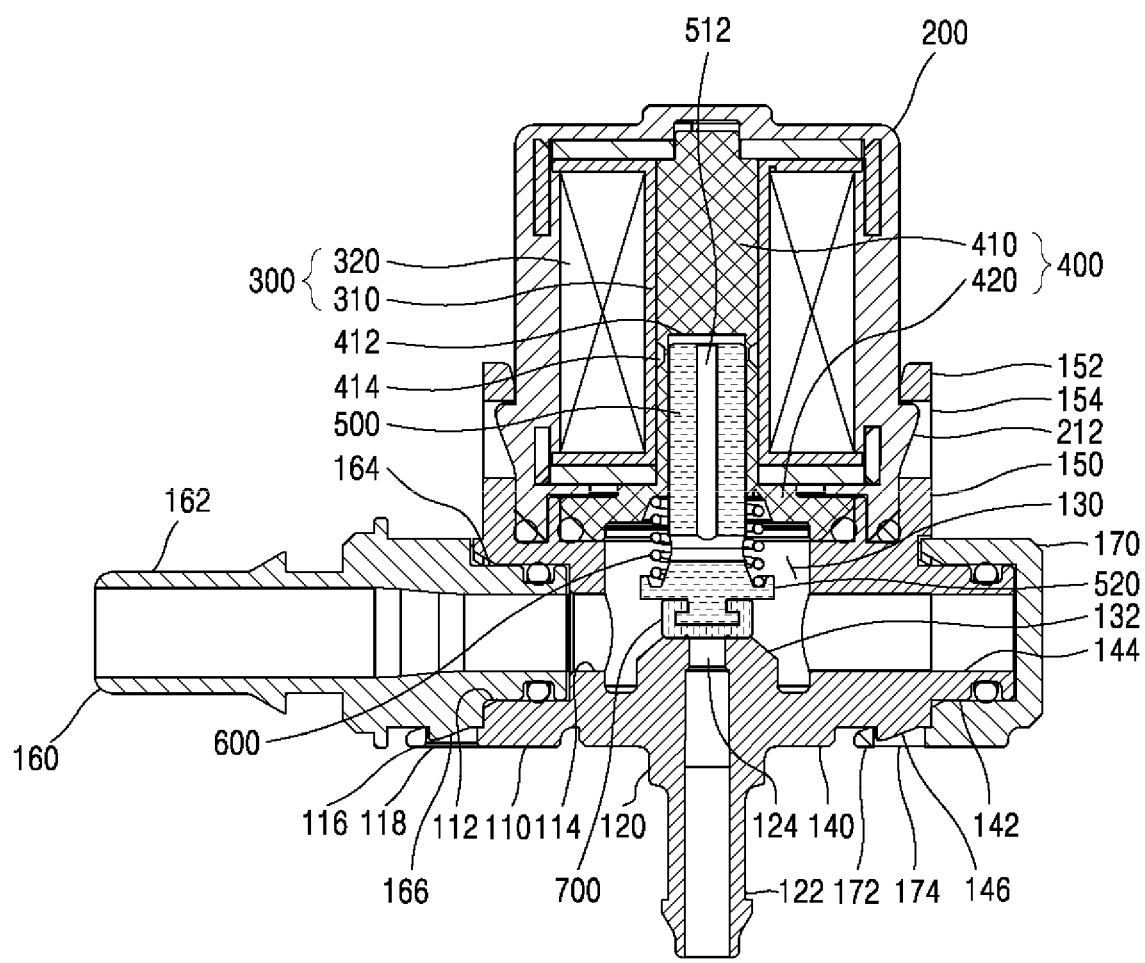
FIG. 2 is a cross-sectional view of the washer liquid supply valve according to one embodiment of the present invention.
Figure 3:
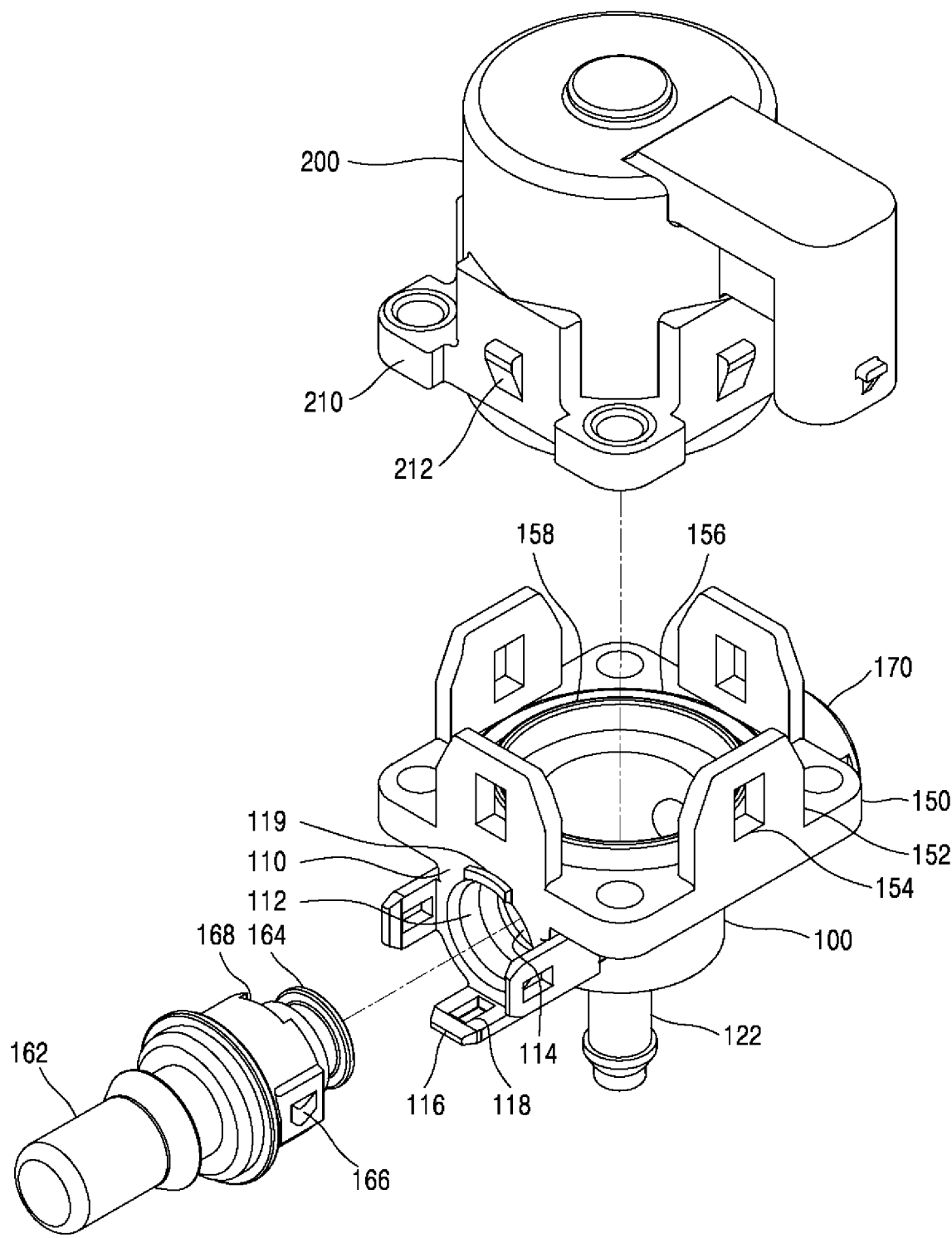
FIGS. 3 and 4 are exploded perspective views of the washer liquid supply valve according to one embodiment of the present invention.
Figure 4:
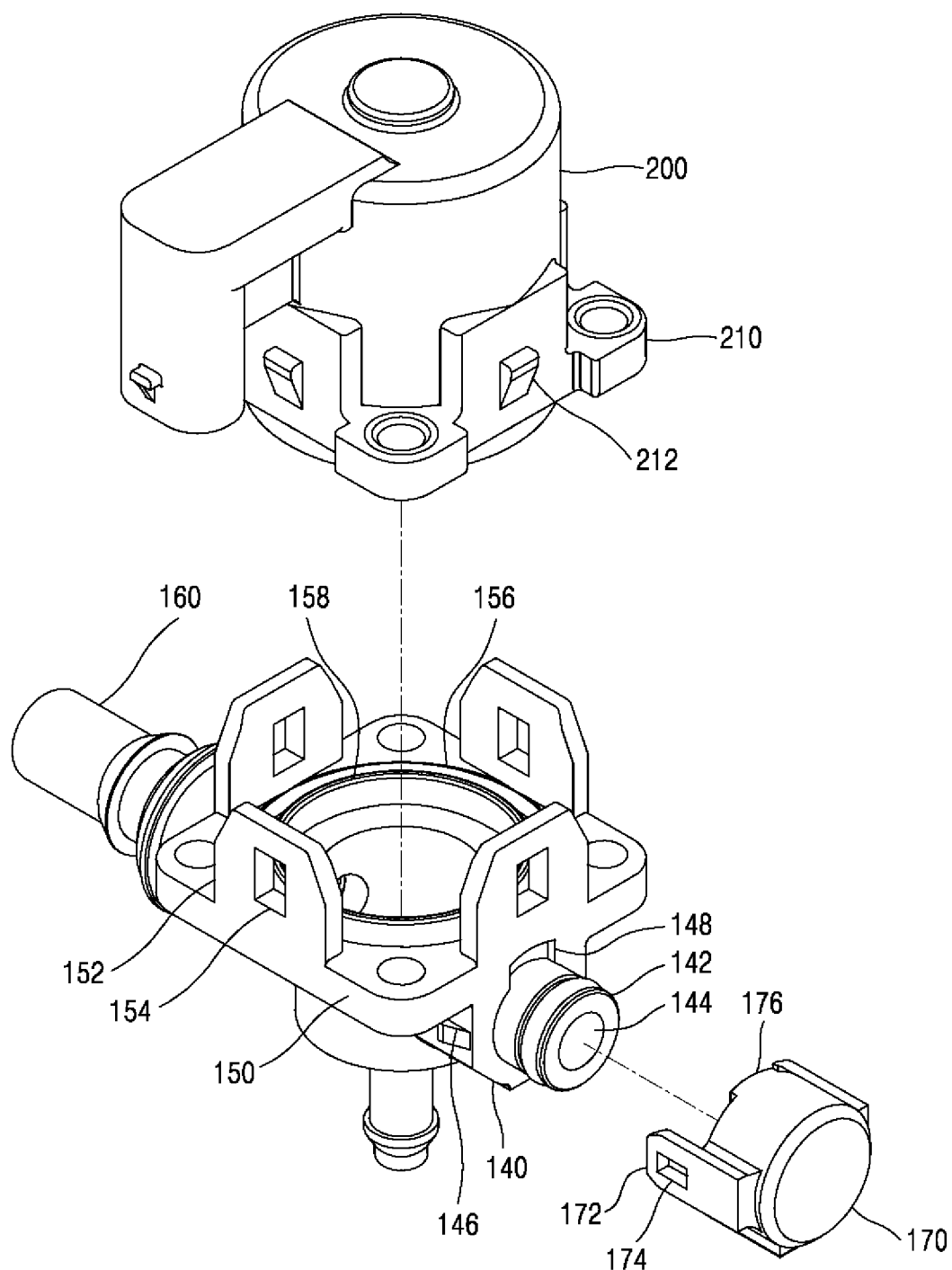

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter, reference will be made in detail to various embodiments of the present invention, examples of which are illustrated in the accompanying drawings and described below. In the following description of the present invention, a detailed description of known functions and configurations incorporated herein will be omitted when it may make the subject matter of the present invention rather unclear. In addition, in the following description of the embodiments with reference to the drawings, the same or similar elements are denoted by the same reference numerals even though they are depicted in different drawings, and a detailed description thereof will be omitted when it may make the subject matter of the present invention rather unclear.

As shown in FIGS. 1 to 4, a washer liquid supply valve 1 according to one embodiment of the present invention includes a valve body 100, a housing 200 combined with the valve body 100, a coil assembly 300 provided within the valve body 100 and the housing 200, a core 400, a plunger 500, a spring 600 and a valve member 700.

The valve body 100 is formed in a hollow cylindrical structure. An inlet 110 into which a washer liquid is supplied is formed at one side (the left side in the figures) of the valve body 100, and an outlet 120 from which the washer liquid is discharged is formed at a lower part of the valve body 100.

A connection groove 112 having a designated depth is formed at the inlet 110, and an adaptor 160 for connection to a washer liquid supply hose (not shown) is combined with the connection groove 112. Here, the washer liquid transferred through the adaptor 160 flows into the valve body 100 through an inflow hole 114 formed inside the connection groove 112.

The adaptor 160 is formed in a multistage pipe structure extending in one direction. A nipple 162 into which the hose (not shown) is inserted is formed at one end of the adaptor 160, and a connection protrusion 164 inserted into the connection groove 112 is formed at the other end of the adaptor 160.

The above-described adaptor 160 is detachably combined with the valve body 100 so as to be installed at or removed from the valve body 100, as needed.

For this purpose, elastic pieces 116, each of which includes a hook hole 118, are formed at the circumference of the connection groove 112 (except for the upper part of the connection groove 112), and coupling hooks 166 having a tapered shape and inserted into the hook holes 118 protrude from the middle part of the adaptor 160.

A positioning protrusion 119 is formed at the inlet no so as to limit the combined position of the adaptor 160, and a positioning groove 168 corresponding to the positioning protrusion 119 is formed at the adaptor 160.

A nipple 122 for connection to a washer liquid discharge hose (not shown) is formed at the outlet 120, and a discharge hole 124 configured to discharge the washer liquid flowing into the valve body wo therefrom is formed inside the nipple 122.

The inflow hole 114 of the inlet no and the discharge hole 124 of the outlet 120 are connected through a flow path 130 formed in the valve body 100. Here, a valve seat 132 protrudes from the bottom of the flow path 130 provided with the discharge hole 124.

As shown in these figures, a connector 140 is formed at the other side (the right side in the figures) of the valve body 100, a connection protrusion 142 is formed on the connector 140, and a connection hole 144 is formed inside the connection protrusion 142. Here, the connection hole 144 is connected to the inflow hole 114 and the discharge hole 124 through the flow path 13o.

A cap 170 configured to open or close the connection hole 144 is combined with the connection protrusion 142. The cap 170 is detachably combined with the valve body 100 so as to be installed at and removed from the valve body 100, as needed.

For this purpose, coupling hooks 146 having a tapered shape protrude the circumference of the connection protrusion 142 (except for the upper part of the connection protrusion 142), and elastic pieces 172, each of which includes a hook hole 174, are formed on the cap 170 so that the coupling hooks 146 are inserted into the elastic pieces 172.

Further, a positioning groove 148 is formed in the connector 140 so as to limit the combined position of the cap 170, and a positioning protrusion 176 corresponding to the positioning groove 148 is formed on the cap 170.

As shown in these figures, the upper surface of the valve body wo is open, and a flange 150 configured to install the housing 200 thereon is provided on the open upper surface of the valve body 100. Here, the flange 150 has a rectangular shape so as to increase the contact area with the housing 200.

Elastic pieces 152 for combination with the housing 200 are formed on the upper surface of the flange 150, and hook holes 154 are formed in the respective elastic pieces 152 so that coupling hooks 212 of the housing 200 are inserted into the hook holes 154.

The above-described elastic pieces 152 are formed at the respective sides of the upper surface of the flange 150, and are pressed against front, rear and both side surfaces of the housing 200, thereby preventing the housing 200 combined with the valve body 100 from moving in the horizontal direction.

A combination groove 156 is formed in the upper surface of the valve body 100, and a partition 158 is formed inside the combination groove 156. Here, the partition 158 is spaced apart from the inner wall surface of the combination groove 156 in a radially inward direction, and the lower end of the housing 200 is inserted between the combination groove 156 and the partition 158.

As described above, when the lower end of the housing 200 is inserted between the combination groove 156 and the partition 158 so as to be supported, movement of the housing 220 in the horizontal direction may be firmly prevented.

The housing 200 is formed in a hollow cylindrical structure, and a flange 210 is formed at the circumference of the lower end of the housing 200 contacting the valve body 100. The flange 210 has a rectangular shape corresponding to the shape of the flange 150 of the valve body 100, and coupling hooks 212 inserted into the hook holes 154 are formed on the respective sides of the flange 210.

The coil assembly 300 is installed in the housing 200, and generates magnetic force for attracting the plunger 500 when power is applied to the washer liquid supply valve 1. The coil assembly 300 includes a bobbin 310 formed in a hollow spool structure, and a coil 320 wound on the outer circumferential surface of the bobbin 310.

When power is applied to the washer liquid supply valve 1, the core 400 is magnetized by magnetic force generated by the coil 320, and the plunger 500 is moved upwards by attractive force generated by the magnetized core 400. Here, the intensity of the attractive force, i.e., magnetic force, is proportional to the intensity of current flowing along the coil 320 and the number of turns of the coil 320 wounded on the bobbin 310.

The core 400 is a stationary iron core magnetized by the magnetic force generated by the coil 320. The core 400 includes a core body 410 formed in a cylindrical structure inserted into the bobbin 310, and a first flange 420 formed at the lower end of the core body 410.

An operating space 412 configured to allow the plunger 500 to be movable therein is formed inside the core body 410, and a magnetism strengthening groove 414 configured to strengthen attractive force caused by the magnetic force is formed in the outer circumferential surface of the core body 410. Here, the operating space 413 extends from the middle part to the lower end of the core body 410, and the magnetism strengthening groove 414 is formed in the outer circumferential surface of the middle part of the core body 410 corresponding to the bottom of the operating space 412.

The plunger 500 is installed in the core 400, i.e., in the operating space 412, so as to be movable, and is moved upwards by the attractive force generated by the coil 320 when power is applied to the washer liquid supply valve 1. On the other hand, when power supply is cut off, the plunger 500 is moved downwards by the spring 600, which will be described below.

The plunger 500 is a round rod extending in one direction, and a passage 512 connected to the operating space 412 is formed inside the plunger 500. Here, the passage 512 is connected to the flow path 130 through the lower end of the plunger 500, thereby being capable of solving operational resistance of the plunger 500 due to the fluid present in the operating space 412.

A second flange 520 is formed at the lower end of the plunger 500. Further, the spring 600 is interposed between the first flange 420 of the core 400 and the second flange 520 of the plunger 500.

The spring 600 is interposed between the first flange 420 and the second flange 520 and elastically supports the plunger 500 towards the valve body 100. That is, the spring 600 elastically supports the plunger 500 downwards so that the valve member 700 installed at the lower end of the plunger 500 closes the discharge hole 124.

The valve member 700 is installed at the lower end of the plunger 500, and thus serves to open and close the discharge hole 124. The valve member 70 may be made of a material having designated elasticity and stiffness so as to be firmly pressed against the valve seat 132 and to prevent problems, such as delamination, in spite of long-term use.

When power is supplied to the washer liquid supply valve 1 having the above-described configuration, the coil assembly 300 generates magnetic force, and the plunger 500 is moved upwards by the generated magnetic force and thus opens the discharge hole 124. On the other hand, when power supply to the washer liquid supply valve 1 is cut off, the plunger 500 is moved downwards by the elastic force of the spring 600 interposed between the first flange 420 and the second flange 520 and thus closes the discharge hole 124.

Further, two or more washer liquid supply valves 1 according to the present invention may be connected, as needed by a user.

Figure 5:
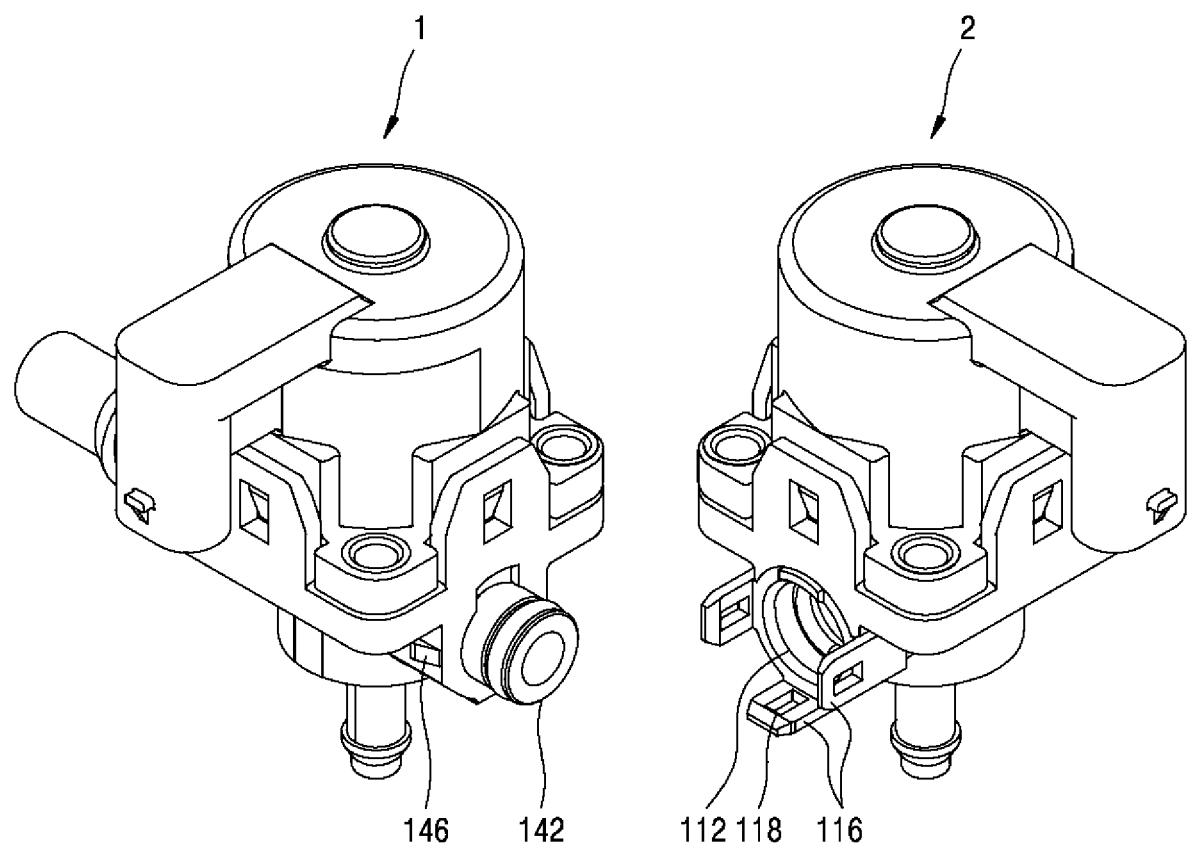
FIGS. 5 and 6 are perspective views illustrating the used state of the washer liquid supply valve according to one embodiment of the present invention.
Figure 6:
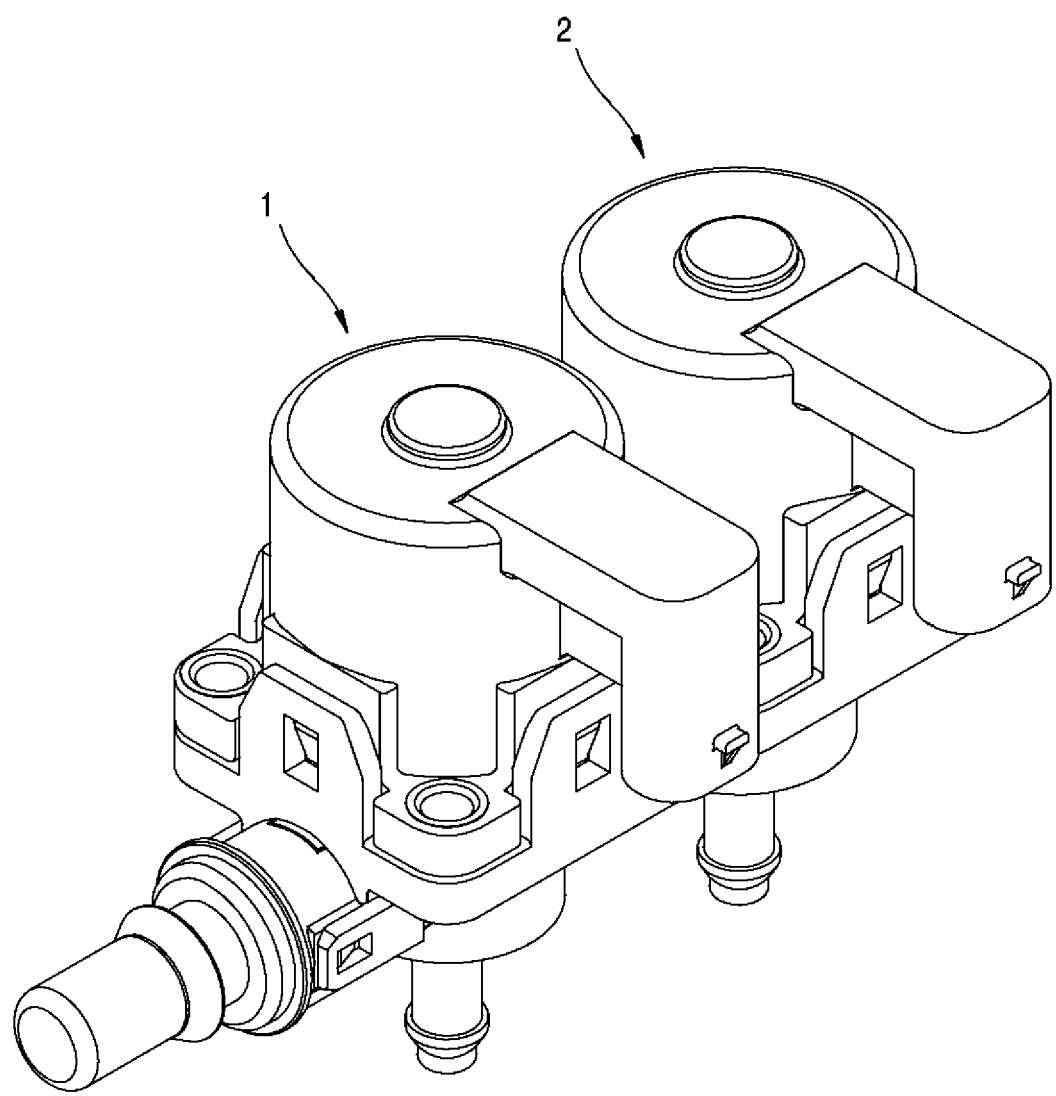

Shown in FIGS. 5 and 6, a pair of washer liquid supply valves 1 and 2 is prepared, a cap (not shown) is removed from one washer liquid supply valve 1, and an adaptor (not shown) is removed the other washer liquid supply valve 2.

Thereafter, the connection protrusion 142 of the washer liquid supply valve 1, from which the cap is removed, is inserted into the connection groove 112 of the washer liquid supply valve 2, from which the adaptor is removed. Here, connection between the two washer liquid supply valves 1 and 2 is completed by inserting the coupling hooks 146 of the washer liquid supply valve 1 into the hook holes 118 formed in the elastic pieces 116 of the washer liquid supply valve 2.

As is apparent from the above description, a washer liquid supply valve according to the present invention controls supply of a washer liquid using magnetic force, thereby being capable of improving operability, responsiveness and effectiveness.

Further, the washer liquid supply valve according to the present invention is easily assembled through one-touch combination between a valve body and a housing, thereby being capable of shortening a time taken to assemble the washer liquid supply valve and improving productivity.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A washer liquid supply valve comprising:
   a valve body provided with an inflow hole and a discharge hole configured to allow a washer liquid to flow into and out of the valve body therethrough, the valve body also having a flow path connecting the inflow hole and the discharge hole;
   a housing detachably combined with an upper part of the valve body;
   a coil assembly installed in the housing and configured to generate a magnetic force based on power applied to the washer liquid supply valve;
   a core arranged at the coil assembly and becoming magnetized based on the magnetic force;
   a plunger installed in the core so and configured to be moved upwards when the power is applied to the washer liquid supply valve;
   a spring interposed between the core and the plunger and configured to elastically support the plunger with respect to the valve body;
   a valve member installed at a lower end of the plunger and configured to open or close the flow path based on the plunger being moved,
   wherein a combination groove is formed in an upper surface of the valve body, a partition being formed inside the combination groove, and
   wherein a lower end of the housing is inserted between an inner wall surface of the combination groove and the partition;
   elastic pieces protruding from a circumference of the upper surface of the valve body, each of the elastic pieces comprising a hook hole; and
   coupling hooks arranged at an outer wall of the housing, the coupling hooks insertable into the hook holes of the elastic pieces.

2. The washer liquid supply valve of claim 1, wherein an outer circumferential surface of the core comprises a magnetism strengthening groove configured to strengthen an attractive force caused by the magnetic force.

3. The washer liquid supply valve of claim 2,
   wherein the core comprises an operating space configured to allow the plunger to be movable therein, the operating space being a hole extending from a lower end of the core to a middle part of the core, and
   wherein the magnetism strengthening groove is arranged on the outer circumferential surface of the core so as to correspond to a bottom of the operating space.

4. The washer liquid supply valve of claim 3, wherein the plunger comprises a passage connected to the operating space, the passage being connected to the flow path through the lower end of the plunger.

5. The washer liquid supply valve of claim 4, wherein the core comprises a first flange on a circumference of the lower end of the core, wherein the plunger comprises a second flange on a circumference of the lower end of the plunger, and wherein the spring is located between the first flange and the second flange.

6. A washer liquid supply valve comprising:
a valve body provided with an inflow hole and a discharge hole configured to allow a washer liquid to flow into and out of the valve body therethrough, the valve body also having a flow path connecting the inflow hole and the discharge hole;
a housing detachably combined with an upper part of the valve body;
a coil assembly installed in the housing and configured to generate a magnetic force based on power is applied to the washer liquid supply valve;
a core arranged at the coil assembly and becoming magnetized when the coil assembly generates the magnetic force;
a plunger installed in the core and configured to be moved upwards when the power is applied to the washer liquid supply valve;
a spring interposed between the core and the plunger and configured to elastically support the plunger with respect to the valve body;
a valve member installed at a lower end of the plunger and configured to open or close the flow path when the plunger is moved,
wherein the core comprises:
on an outer circumferential surface, a magnetism strengthening groove configured to strengthen an attractive force caused by the magnetic force, and
an operating space inside the core, the operating space being a hole extending from a lower end of the core to a middle part of the core and configured to allow the plunger to move therein,
wherein the magnetism strengthening groove on the outer circumferential surface of the core is arranged so as to correspond to a bottom of the operating space, and
wherein the magnetism strengthening groove has an uneven shape; and
an inlet located at the inflow hole and comprising a positioning protrusion configured to limit a position of an adaptor connectable to the inlet,
wherein the plunger comprises a passage connected to the operating space, the passage being connected to the flow path through the lower end of the plunger.

7. The washer liquid supply valve of claim 6, wherein the core comprises a first flange on a circumference of the lower end of the core, wherein the plunger comprises a second flange on a circumference of the lower end of the plunger, and wherein the spring is located between the first flange and the second flange.

8. The washer liquid supply valve of claim 6, further comprising the adaptor comprising a positioning groove corresponding to the positioning protrusion of the inlet.

9. A washer liquid supply valve comprising:
a valve body provided with an inflow hole and a discharge hole configured to allow a washer liquid to flow into and out of the valve body therethrough, the valve body also having a flow path connecting the inflow hole and the discharge hole;
a housing detachably combined with an upper part of the valve body;
a coil assembly installed in the housing and configured to generate a magnetic force based on power applied to the washer liquid supply valve;
a core arranged at the coil assembly and becoming magnetized when the coil assembly generates the magnetic force;
a plunger installed in the core and configured to be moved upwards based on the power applied to the washer liquid supply valve;
a spring interposed between the core and the plunger and configured to elastically support the plunger with respect to the valve body; and
a valve member installed at a lower end of the plunger and configured to open or close the flow path when the plunger is moved;
a connection groove located at one side of the valve body, wherein the inflow hole is surrounded by the connection groove;
a connection protrusion arranged at a side of the valve body opposite to the one side, a connection hole connected to the flow path being arranged in the connection protrusion,
wherein the core comprises:
a magnetism strengthening groove on an outer circumferential surface of the core, the magnetism strengthening groove configured to strengthen an attractive force caused by the magnetic force, and
an operating space configured to allow the plunger to be movable therein, the operating space, arranged inside the core, being a hole extending from a lower end of the core to a middle part of the core,
wherein the magnetism strengthening groove is arranged on the outer circumferential surface of the core so as to correspond to a bottom of the operating space, and
wherein the magnetism strengthening groove has an uneven shape; and
an inlet located at the inflow hole and comprising the connection groove and a positioning protrusion configured to limit a position of an adaptor connectable to the inlet,
wherein the plunger comprises a passage connected to the operating space, the passage being connected to the flow path through the lower end of the plunger.

10. The washer liquid supply valve of claim 9, further comprising the adaptor configured to supply the washer liquid, the adaptor being detachably installed at the inlet.

11. The washer liquid supply valve of claim 10, further comprising:
elastic pieces protruding from a circumference of the inlet, each of the elastic pieces comprising a hook hole; and
coupling hooks arranged at an outer wall of the adaptor, the coupling hooks insertable into the hook holes of the valve body.

12. The washer liquid supply valve of claim 10, further comprising a cap combined with the opposite side of the valve body, the cap configured to open or close the connection hole.

13. The washer liquid supply valve of claim 10, further comprising elastic pieces protruding from a circumference of the inlet, each of the elastic pieces comprising a hook hole for securing the adaptor to the valve body.

14. The washer liquid supply valve of claim 13, wherein the inlet comprises three elastic pieces and the positioning protrusion, and wherein the elastic pieces are arranged at three sides of the inlet and the position protrusion is arranged at a fourth side of the inlet.

15. The washer liquid supply valve of claim 9, wherein the core comprises a first flange on a circumference of the lower end of the core, wherein the plunger comprises a second flange on a circumference of the lower end of the plunger, and wherein the spring is located between the first flange and the second flange.

\* \* \* \* \*